Figure 1:
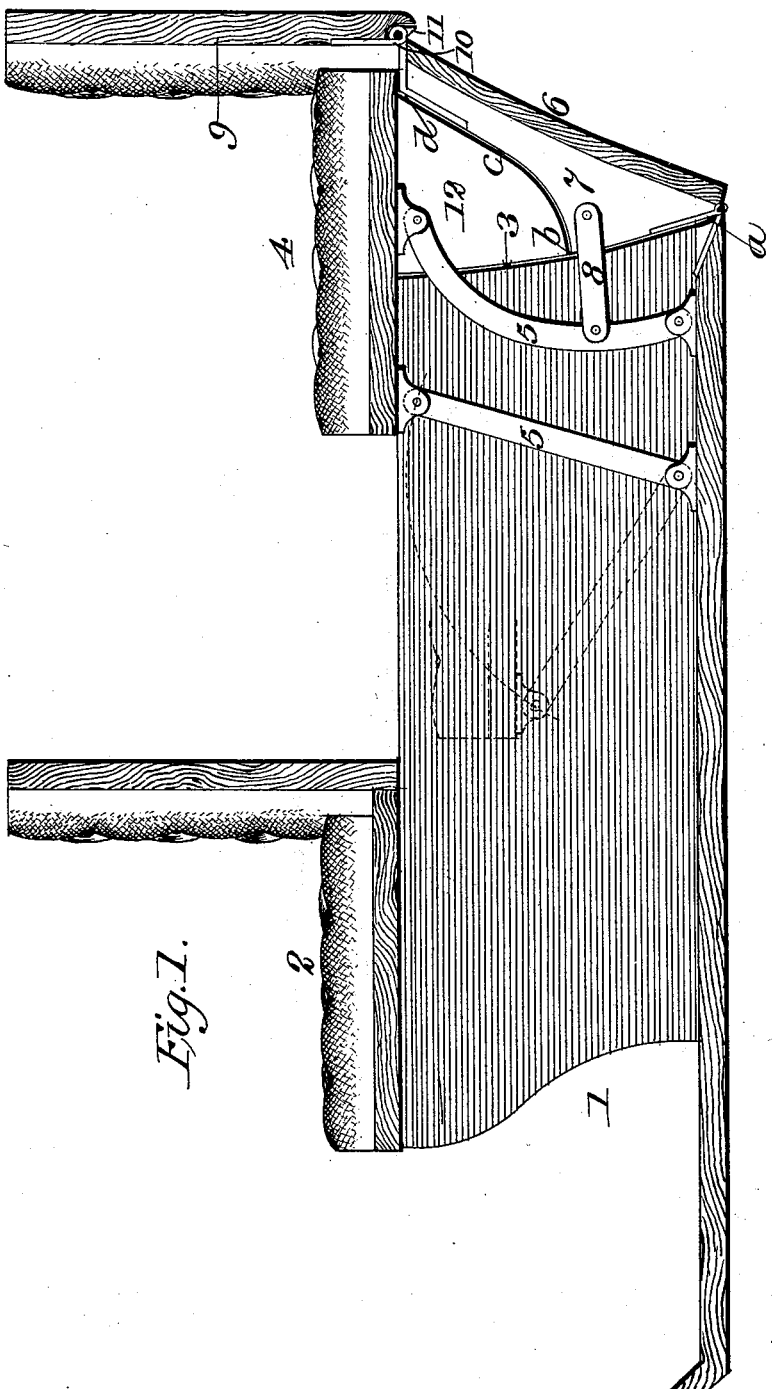

(No Model.) 2 Sheets—Sheet 1.

J. CURRIER & F. ELLIS.
CARRIAGE.

No. 508,919. Patented Nov. 21, 1893.

WITNESSES
Thos. J. Routt, Jr.
Jas. T. O'Neale.

INVENTORS
John Currier
Frederick Ellis
By H. C. Evans & Co
Attorneys.

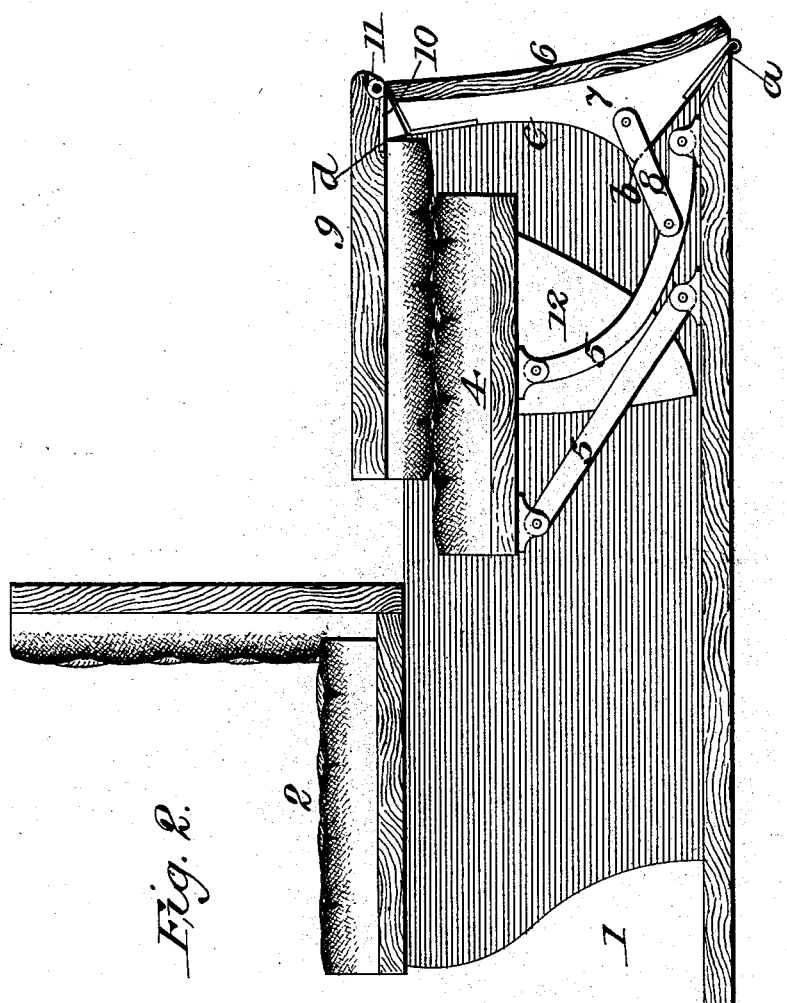

UNITED STATES PATENT OFFICE.

JOHN CURRIER AND FREDERICK ELLIS, OF AMESBURY, MASSACHUSETTS.

CARRIAGE.

SPECIFICATION forming part of Letters Patent No. 508,919, dated November 21, 1893.

Application filed August 4, 1893. Serial No. 482,356. (No model.)

*To all whom it may concern:*

Be it known that we, JOHN CURRIER and FREDERICK ELLIS, citizens of the United States, residing at Amesbury, in the county of Essex and State of Massachusetts, have invented certain new and useful Improvements in Carriages, of which the following is a full, clear, and exact description, reference being had to the accompanying drawings, and to figures of reference marked thereon, forming a part of this specification.

Our invention relates to carriages.

It has for its object to provide a two seat carriage which may be changed from a single to a double seat carriage and which when used as a double seat carriage will close the space between the tail board and the rear ends of the sides; furthermore to provide a carriage in which the rear seat will be firmly supported when in use; and finally, to provide a carriage which shall be simple and strong of construction, durable in use, and comparatively inexpensive of production.

With these objects in view, the invention consists in certain features of construction and combination of parts which shall be hereinafter described and claimed.

In the accompanying drawings, Figure 1, is a vertical sectional view of as much of the body-portion of a carriage as is necessary to illustrate our invention, showing the rear seat in position for use, and Fig. 2, is a similar view showing the rear seat closed or folded down out of use.

In the drawings, 1 denotes the body of a vehicle and 2, the front seat. These parts may be of any well known or preferred construction.

The rear ends of the sides of the body are cut on a curve or incline as shown at 3 for purposes hereinafter described.

4 denotes the rear seat supported by two sets of jumping irons 5 each set being pivoted to the bottom of the body with their lower ends and with their upper ends to the under side of the rear seat.

6 denotes the tail-board which is suitably hinged at its lower end to the rear end of the bottom of the body. This tail-board has secured to its ends inwardly projecting extensions 7, triangular or approximately so in form. As shown, the inner edge of each extension is cut on a straight line from $a$ to $b$. From $b$ to $c$ the line is curved, and from $c$ to $d$ the edge is straight.

8 denotes links pivoted to each extension and to each of the rear jumping-irons so that when the rear seat is swung forward and downward the tail-board will be moved inward as hereinafter explained.

9, denotes the deck-panel the inner face of which may be upholstered or not. It is hinged to the upper end of the tail-board by a hinge 10, provided with a stop 11 to limit its outward movement.

12, denotes the seat extensions. These extensions are secured to the under side of the seat and like the tail-board extensions have their forward edges cut to conform to the rear ends of the sides of the body and their lower and rear edges cut to correspond with the lines from $b$ to $d$ of the tail-board extensions so that the two sets of extensions may snugly come together and entirely close the space which would otherwise be left between the tail-board and the rear ends of the sides.

The operation is as follows: The seat being lowered and out of use, the deck-panel is now raised upward and backward carrying with it the tail-board which at the same time raises upward and carries backward the seat, the several parts assuming the position shown in Fig. 1, where it will be seen that the seat extensions have raised into the seat formed in the upper edges of the tail-board extension, thereby effectually supporting the rear seat and locking the tail-board against rearward movement.

We are aware of the fact that we are not the first to provide the tail-board of a vehicle with extensions to close the space formed between the ends of the side boards and the tail-board when the said tail-board is swung backward, and we would therefore have it understood that we do not claim broadly such construction, but What we do claim, and desire to secure by Letters Patent of the United States, is—

1. The combination with the sides of the body of a vehicle having a downward and rearward slant, of a tail-board having extensions the forward edges of which correspond with the lower portion of the slanting edges of the sides, and a hinged seat having extensions the forward edges of which correspond with the upper slanting edges of the sides and the rear edges, corresponding with and fitting the upper edges of the tail-board extensions, whereby the space between the tail-board and sides is closed, the rearward movement of the tail-board limited, and the seat supported, substantially as herein described.

2. In combination, a vehicle body the sides of which are provided with rearward and downward inclined side edges, a tail-board hinged to said body and provided with side extensions the forward edges of which correspond with the incline of the sides, and the upper edges of which are curved and then carried straight, a pivoted seat provided with extensions the edges of which correspond with the inclined edges of the tail-board extensions, and a connection between said seat and tail-board, substantially as herein described.

3. In combination a vehicle body, a rear seat, jumping irons connecting said seat with said body, a tail-board having side extensions, links connecting the side extensions with one pair of jumping irons, extensions carried by said seat, whereby the said extensions will contact and close the space between the ends of the sides and the tail-board, substantially as herein described.

4. In combination a carriage body, the rear ends of the sides of which are cut on a downward and rearward slant, a swinging seat, having extensions, the forward edges of which are cut on a corresponding slant, a hinged tail-board having side extensions also cut on a corresponding slant, said tail-board and seat extensions adapted to fit together and engage the rear slanting edges of the sides, the two sets of extensions thus closing the space between the sides and the tail-board, substantially as herein described.

5. In combination a carriage body the rear ends of the sides of which are cut on a downward and rearward slant, a swinging seat provided with extensions having a corresponding slant, a hinged tail-board provided with side extensions also having a corresponding slant, means for connecting the tail-board with the said seat so that they move in unison and a deck panel hinged to said tail-board, substantially as herein described.

JOHN CURRIER.
FREDERICK ELLIS.

Witnesses:
JACOB T. CHOATE,
OLIVER PEASE.